US011662039B2

(12) United States Patent
Renollett et al.

(10) Patent No.: US 11,662,039 B2
(45) Date of Patent: May 30, 2023

(54) HIGH PRESSURE DIRECT PILOT ACTUATED VALVE

(71) Applicant: TESCOM CORPORATION, Elk River, MN (US)

(72) Inventors: Jacob T. R. Renollett, Andover, MN (US); Bogdan G. Ungureanu, Wayne, NJ (US)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 17/529,250

(22) Filed: Nov. 17, 2021

(65) Prior Publication Data

US 2022/0154844 A1 May 19, 2022

Related U.S. Application Data

(60) Provisional application No. 63/115,601, filed on Nov. 18, 2020.

(51) Int. Cl.
*F16K 31/40* (2006.01)
*F16K 27/02* (2006.01)

(52) U.S. Cl.
CPC ......... *F16K 31/406* (2013.01); *F16K 27/02* (2013.01)

(58) Field of Classification Search
CPC ...... F16K 31/406; F16K 31/408; F16K 27/02; F16K 31/0655; F02M 21/023; F02M 21/0239; F02M 21/0242; F02M 21/0245
See application file for complete search history.

(56) References Cited

U.S. PATENT DOCUMENTS

| 1,633,217 | A | * | 6/1927 | Littlefield | ............. F16K 31/408 251/38 |
| 2,129,938 | A | * | 9/1938 | Johnson | ................. F16K 31/406 251/30.02 |
| 3,865,140 | A | * | 2/1975 | Greenwood | ........ F15B 13/0405 137/625.65 |
| 5,546,980 | A | * | 8/1996 | Kosarzecki | ............. F16K 27/02 137/454.6 |
| 6,328,275 | B1 | * | 12/2001 | Yang | ...................... F16K 31/406 137/493 |
| 7,028,713 | B2 | * | 4/2006 | Koyama | ............... F16K 31/406 137/881 |
| 10,077,709 | B2 | * | 9/2018 | Turner | .................. F16K 31/406 |
| 10,480,677 | B2 | * | 11/2019 | Hwang | ................. F16K 27/029 |

(Continued)

FOREIGN PATENT DOCUMENTS

CN 110043675 A * 7/2019

*Primary Examiner* — Umashankar Venkatesan
(74) *Attorney, Agent, or Firm* — Marshall, Gerstein & Borun LLP

(57) ABSTRACT

A pilot actuated valve assembly includes a valve body having an inlet and an outlet, and includes a main valve, a pilot valve, and a pilot cavity which is at a pilot cavity pressure. A tube houses parts of the pilot valve, and a sleeve engages a portion of the tube, with both being secured to the body by a valve bonnet. The main and pilot valves are coaxial. A solenoid actuator or other suitable actuator is operatively coupled to a shaft of the pilot valve and shifts the pilot valve between the positions. Consequently, the main valve shifts between the closed and open positions in response to shifting of the pilot valve between the closed and open positions.

8 Claims, 6 Drawing Sheets

(56) References Cited

U.S. PATENT DOCUMENTS

| | | | | |
|---|---|---|---|---|
| 2007/0290152 | A1* | 12/2007 | Ma | F16K 31/406 |
| | | | | 251/30.01 |
| 2008/0197313 | A1* | 8/2008 | Rubio | B60T 8/363 |
| | | | | 251/366 |
| 2010/0276012 | A1* | 11/2010 | Watanabe | F16K 31/408 |
| | | | | 137/487.5 |
| 2016/0208954 | A1* | 7/2016 | Ito | F16K 31/0665 |

\* cited by examiner

HIGH PRESSURE DIRECT PILOT ACTUATED VALVE

FIELD OF THE INVENTION

This invention relates to direct pilot actuated valve assemblies. More particularly, the invention relates to such valve assemblies arranged to be used with relatively low power solenoid valves relative to the operating pressure and flow capabilities found in, for example, high pressure/high flow hydrogen filling of vehicles.

BACKGROUND

Some fueling applications for vehicles involve the distribution fuel at relatively high pressures and relatively high flows. One example is the hydrogen fueling of vehicles such as passenger cars, where there is a need for an on/off solenoid valve rated for relatively high pressures approaching in some cases 14,500 psig, with a main flow orifice of 0.315 inches, that can use existing solenoid coils employed in hydrogen filling stations for passenger vehicles. Some known valves could be adapted to satisfy design requirements, but the known valves would need an actuating coil rated for very high actuating forces that in some applications could approach 80 pounds of force to actuate the valve. Most solenoid coils are not rated nearly that high. Thus, there is a need for a pilot actuated valve that can handle relatively high pressures with a relatively low coil force.

SUMMARY

In accordance with a first exemplary aspect, a pilot actuated valve assembly includes a valve body having an inlet at inlet pressure, an outlet at outlet pressure, a main orifice having a main valve seat, a main valve bore, and a pilot seat bore, and defines a flow passage extending between the inlet and the outlet. A main valve is disposed in the valve body and is shiftable between a closed position where the main valve is seated against the main valve seat and an open position where the main valve is spaced away from the main valve seat. A pilot valve includes a pilot seat, with the pilot seat disposed in the pilot seat bore of the valve body, and also includes a pilot cavity at a pilot cavity pressure. A tube is includes and has an inner bore, and is positioned over the pilot valve seat, and a sleeve is mounted to the valve body and includes a sleeve bore sized to receive a portion of the tube. The sleeve is positioned to retain the pilot seat within the pilot seat bore and also to retain a lower portion of the tube adjacent the pilot seat. A valve bonnet is mounted over the sleeve and secures the sleeve within the valve body, and a pilot valve or pilot valve assembly or portions of a pilot valve assembly is/are disposed within the tube, with the pilot valve being shiftable between a closed position where the pilot valve is seated against the pilot seat or a control orifice of the pilot seat and an open position where the pilot valve is spaced away from the pilot seat or a control orifice of the pilot seat. A solenoid actuator or other suitable actuator is provided and is operatively coupled to the shaft and is arranged to shift the pilot valve piston between the closed position and the open position. A first passage extends through the main valve or the main valve piston between the inlet and the pilot cavity, and a second passage extends between the pilot cavity and the outlet, with the second passage being closed when the pilot valve is closed and open when the pilot valve is open to vent the pilot cavity pressure to the outlet. Consequently, the main valve shifts between the closed and open positions in response to shifting of the pilot valve between the closed and open positions.

In accordance with a second exemplary aspect, a pilot actuated valve assembly includes a valve body having an inlet at inlet pressure, an outlet at outlet pressure, a main orifice having a main valve seat, a main valve bore, a pilot seat bore, and defining a flow passage extending between the inlet and the outlet. A main valve is disposed in the valve body and shiftable between a closed position where the main valve is seated against the main valve seat and an open position where the main valve is spaced away from the main valve seat. A pilot valve includes a pilot seat, with the pilot seat disposed in the pilot seat bore of the valve body, and with a pilot cavity at a pilot cavity pressure. A tube has an inner bore and is positioned over the pilot valve seat, and a sleeve is mounted to the valve body and includes a sleeve bore sized to receive a portion of the tube, with the sleeve positioned to retain the pilot seat within the pilot seat bore and to retain a lower portion of the tube adjacent the pilot seat. A valve bonnet is mounted over the sleeve and secures the sleeve within the valve body, and a pilot valve is disposed within the tube, with the pilot valve shiftable between a closed position where the pilot valve is seated against the pilot seat and an open position where the pilot valve is spaced away from the pilot seat. An actuator is operatively coupled to the shaft and is arranged to shift the pilot valve piston between the closed position and the open position. A first passage extends through a bleed port in the main valve to the pilot cavity, and a second passage extends between the pilot cavity and the outlet, the second passage closed when the pilot valve is closed and open when the pilot valve is open to vent the pilot cavity pressure to the outlet. Thus, the main valve shifts between the closed and open positions due to a pressure imbalance caused by shifting of the pilot valve between the closed and open positions due to a decrease in pressure in the pilot cavity.

In further accordance with any one or more of the foregoing first, second, third, or fourth aspects, a dual stage regulator and/or method may further include any one or more of the following preferred forms.

In some preferred forms, the main valve includes a main valve piston slidably disposed within the main valve bore and shiftable between a closed position where the main valve piston is seated against the main valve seat and an open position where the main valve piston is spaced away from the main valve seat, and the pilot valve includes a shaft and a piston, the pilot valve piston slidably disposed within the tube and shiftable between a closed position where the pilot valve piston is seated against the pilot seat and an open position where the pilot valve piston is spaced away from the pilot seat.

In some preferred forms, the pilot valve and the main valve are coaxial.

In some preferred forms, the solenoid actuator is coaxial with both the pilot valve and the main valve.

In some preferred forms, the main valve bore has a diameter smaller than a diameter of the pilot seat bore, and wherein the main valve bore and the pilot seat bore are coaxial and formed from a same side of the valve body.

In some preferred forms, a portion of the pilot cavity is disposed between the main piston and the pilot seat.

In some preferred forms, the pilot cavity extends to both sides of the pilot valve such that the pilot valve is balanced.

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
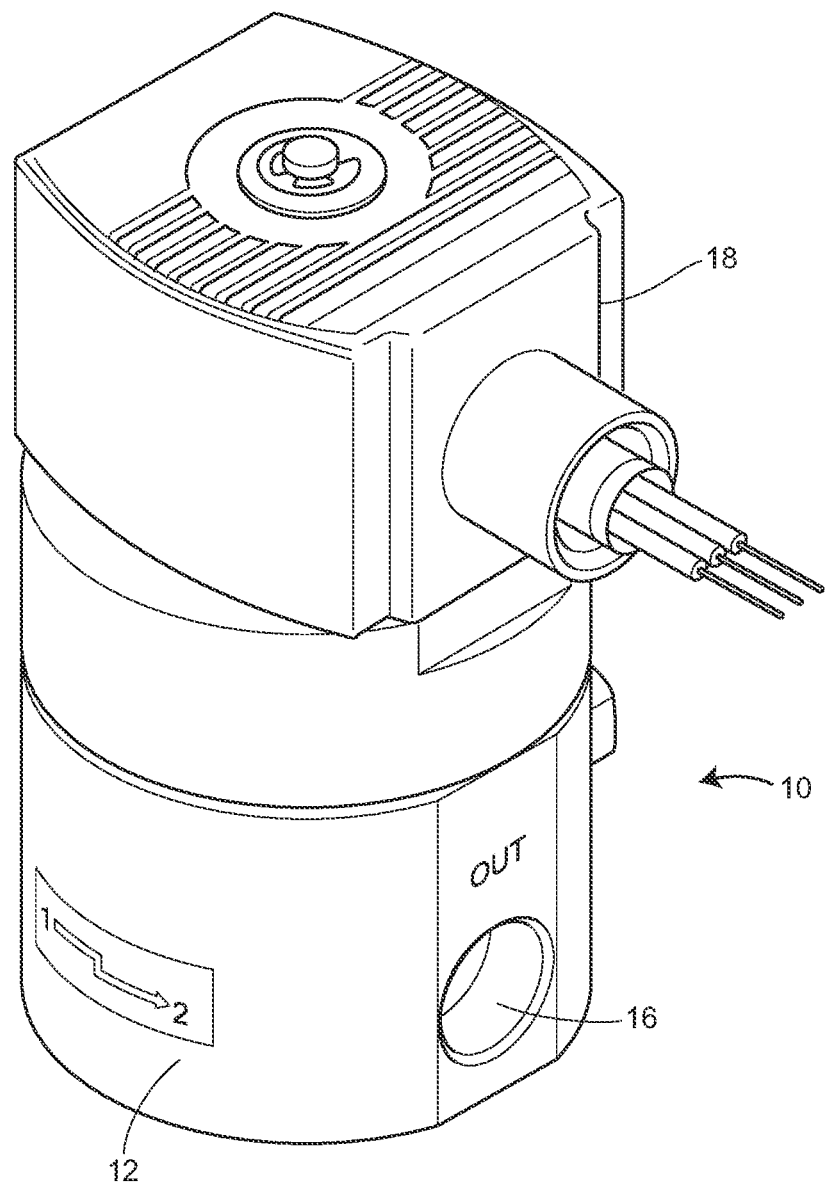
FIG. 1 is a isometric view of a high pressure direct pilot actuated valve assembled in accordance with the teachings of one exemplary embodiment of the disclosed invention.

Referring now to the drawings, FIG. 1 shows a pilot actuated valve assembly 10 assembled in accordance with the teachings of a disclosed example of the present invention. The valve assembly 10 includes a valve body 12 having an inlet 14 (obscured in FIG. 1 but visible in FIG. 2), an outlet 16, and a solenoid actuator 18.

Figure 2:
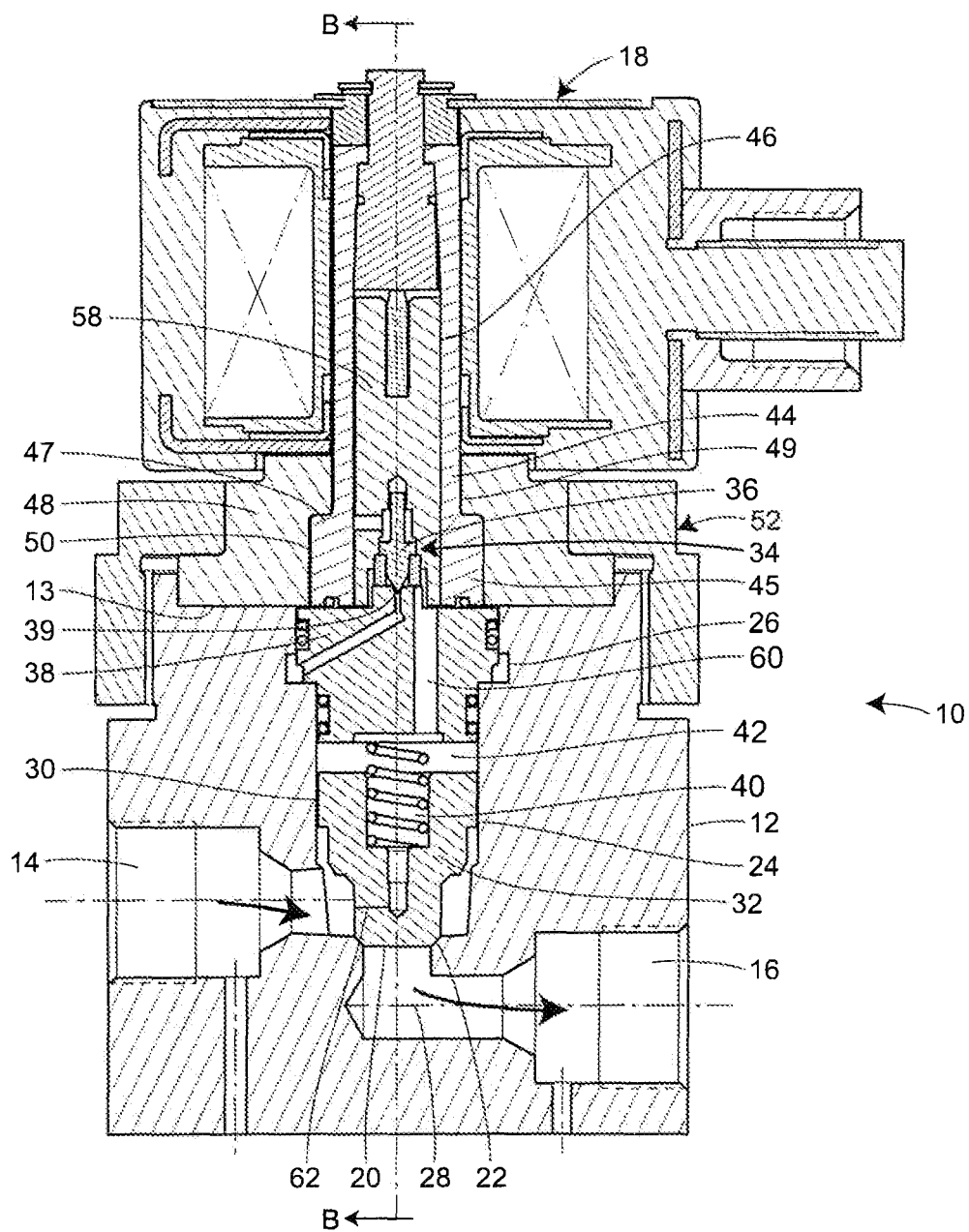
FIG. 2 is a cross-sectional view of the direct pilot actuated valve of FIG. 1.

Referring now to FIG. 2, the inlet 14 is at an inlet pressure P1, the outlet 16 is at outlet an outlet pressure P2. The valve body includes a main orifice 20 having a main valve seat 22, a main valve bore 24, a pilot seat bore 26, and a flow passage 28 extends between the inlet 14 and the outlet 16 and extends through the main orifice 20. A main valve assembly 30 includes a main valve piston 32 is disposed in the valve body 12 and is shiftable between a closed position where the piston 32 of the main valve 30 is seated against the main valve seat 22 thus preventing flow through the flow passage 28, and an open position where the main valve piston 32 of the main valve 30 is spaced away from the main valve seat 22, thus permitting flow through the flow passage 28.

A pilot valve assembly 34 includes a pilot valve piston 36 and a pilot seat 38. The pilot seat 38 is disposed in the pilot seat bore 26 of the valve body 12, and a pilot cavity 40 is disposed within the valve body 12 at a pilot cavity pressure P3. As shown, the pilot cavity includes a space 42 between the piston 32 of the main valve assembly 30 and the pilot seat 38. A tube 44 having an inner bore 46 is positioned over the pilot seat 38, and a sleeve 48 overlies the valve body 12 preferably in a recessed portion 13 of the valve body 12, and abuts both the pilot seat 38 and an upper portion of the valve body 12. The sleeve 48 includes a sleeve bore 50 sized to receive a portion of the tube 44. The sleeve 48 is positioned to retain the pilot seat 38 within the pilot seat bore, and also to retain a lower portion 45 of the tube adjacent the pilot seat 38 by engaging a widened flange 47 on the on the tube 44 with an inwardly extending ledge 49.

A valve bonnet 52 is mounted to the valve body 12, such as by threads, and is disposed over the sleeve 48 and thus secures the sleeve 48 to the valve body 12. Consequently, the bonnet 52 secures each of the pilot seat 38 and the tube 44 to the valve body 12. the pilot valve assembly 34 having the pilot piston 36 is disposed within the tube 44, and is also secured to the valve body 12 by the bonnet 52. The pilot piston 36 is shiftable between a closed position where the pilot piston 36 is seated against a control orifice 39 of the pilot seat 38, and an open position where the pilot piston 36 is spaced away from the control orifice 39 of the pilot seat 38, and the pilot piston 36 is mounted within a shaft 58. The solenoid actuator 18 is operatively coupled to the shaft 58, and in response to the actuator being energized by an energy source (not shown, but known to those of skill in the relevant art), the shaft 58 shifts upwardly, thus opening the pilot valve.

A first passage 60 is formed by a bleed passage 62 that extends through the main piston 32, into the pilot cavity between the main piston and the pilot seat, and to both sides of the pilot piston 36 thus balancing the piston at cavity pressure P3. A second passage 64 (See FIG. 3) extends between the pilot cavity and the outlet, with the second passage being closed when the pilot valve is closed and open when the pilot valve is open to vent the pilot cavity pressure to the outlet. Consequently, the main valve shifts between the closed and open positions in response to shifting of the pilot valve between the closed and open positions.

Figure 3:
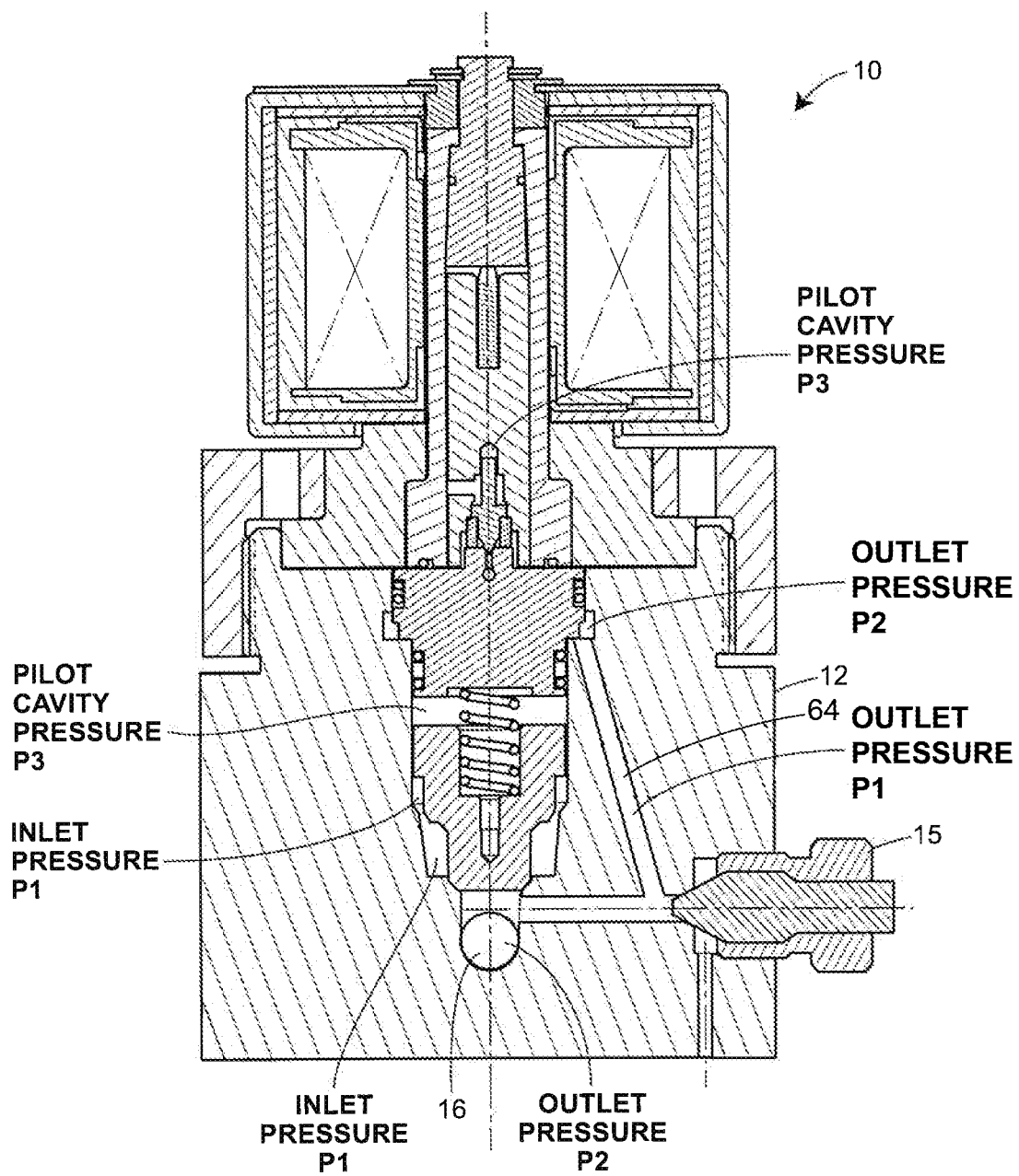
FIG. 3 is a cross-sectional view of the direct pilot operated valve of FIG. 2 taken along lines B-B of FIG. 2.

FIG. 3 and the enlarged fragmentary view of FIG. 3 show the various passages and ports through the valve assembly and is labeled to show what portions of the valve assembly 10 are exposed to which pressures. The area around the main valve piston is subjected to inlet pressure P1, the outlet ports and areas subjected to the outlet pressure are labeled P2, and the passages and ports subject to pilot cavity pressures are labeled P3.

Figure 4:
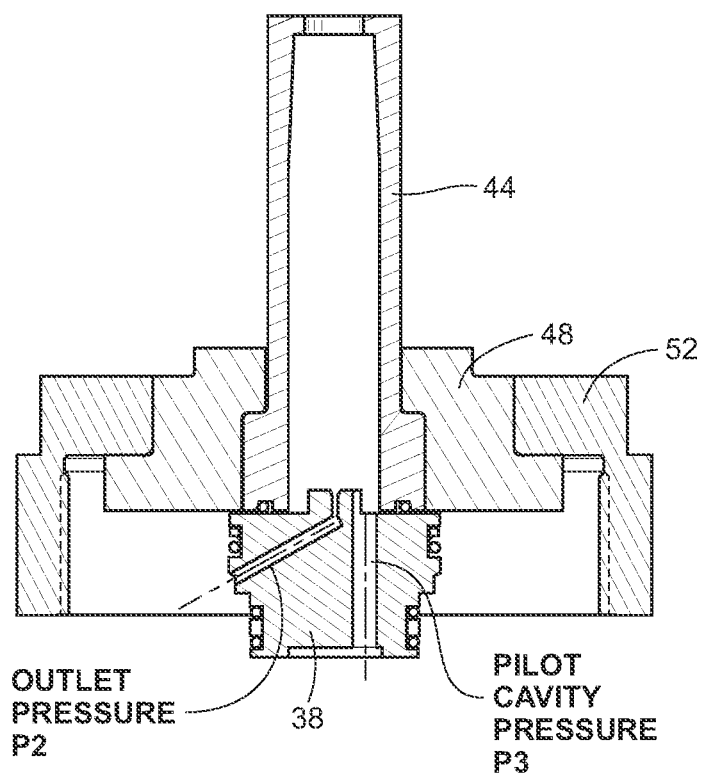
FIG. 4 is an enlarged fragmentary view of an exemplary assembly for retaining a pilot seat, a sleeve, and a tube using a bonnet.
Figure 5:
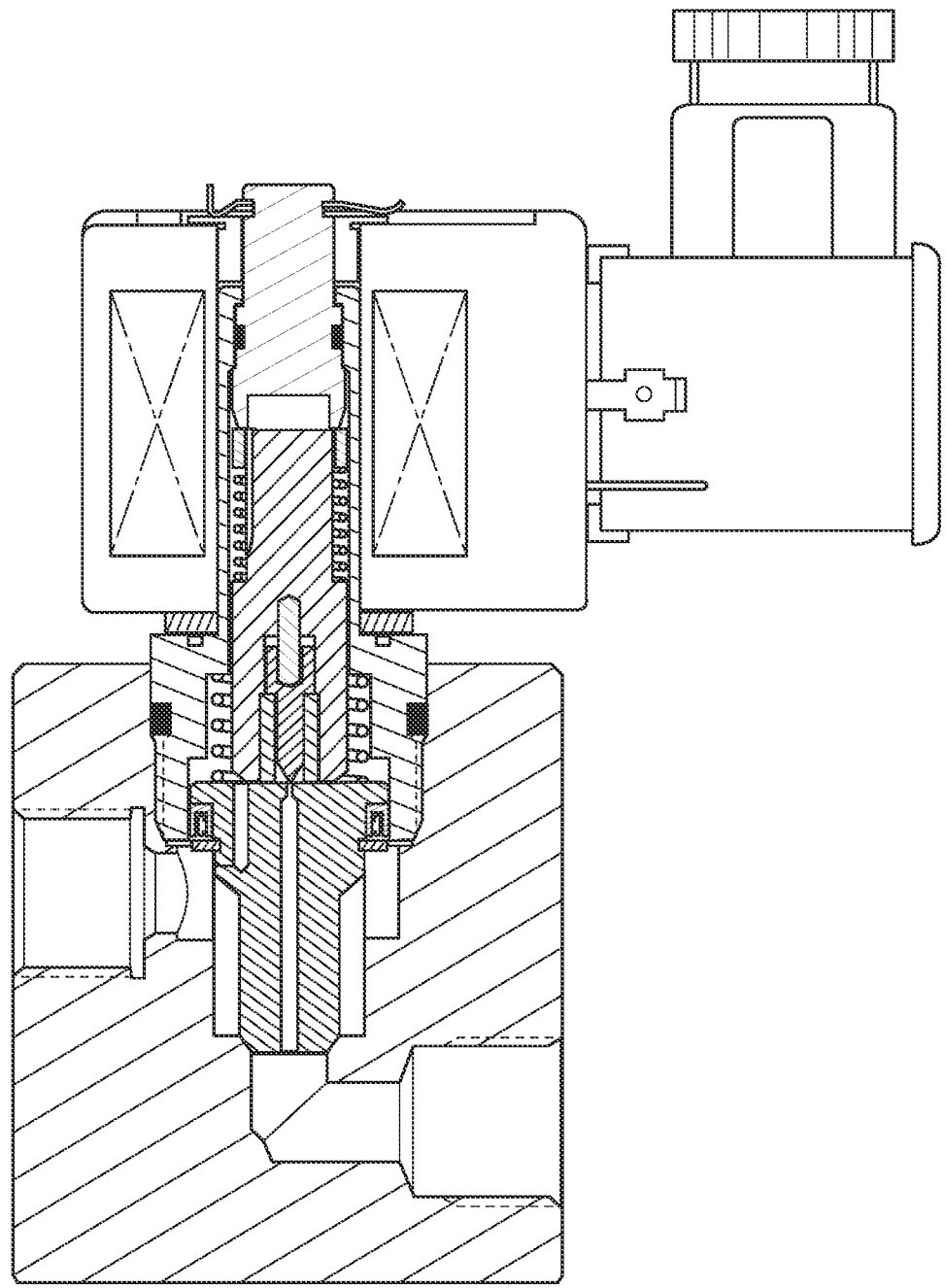
FIG. 5 shows a prior art arrangement requiring a very long stroke solenoid.
Figure 6:
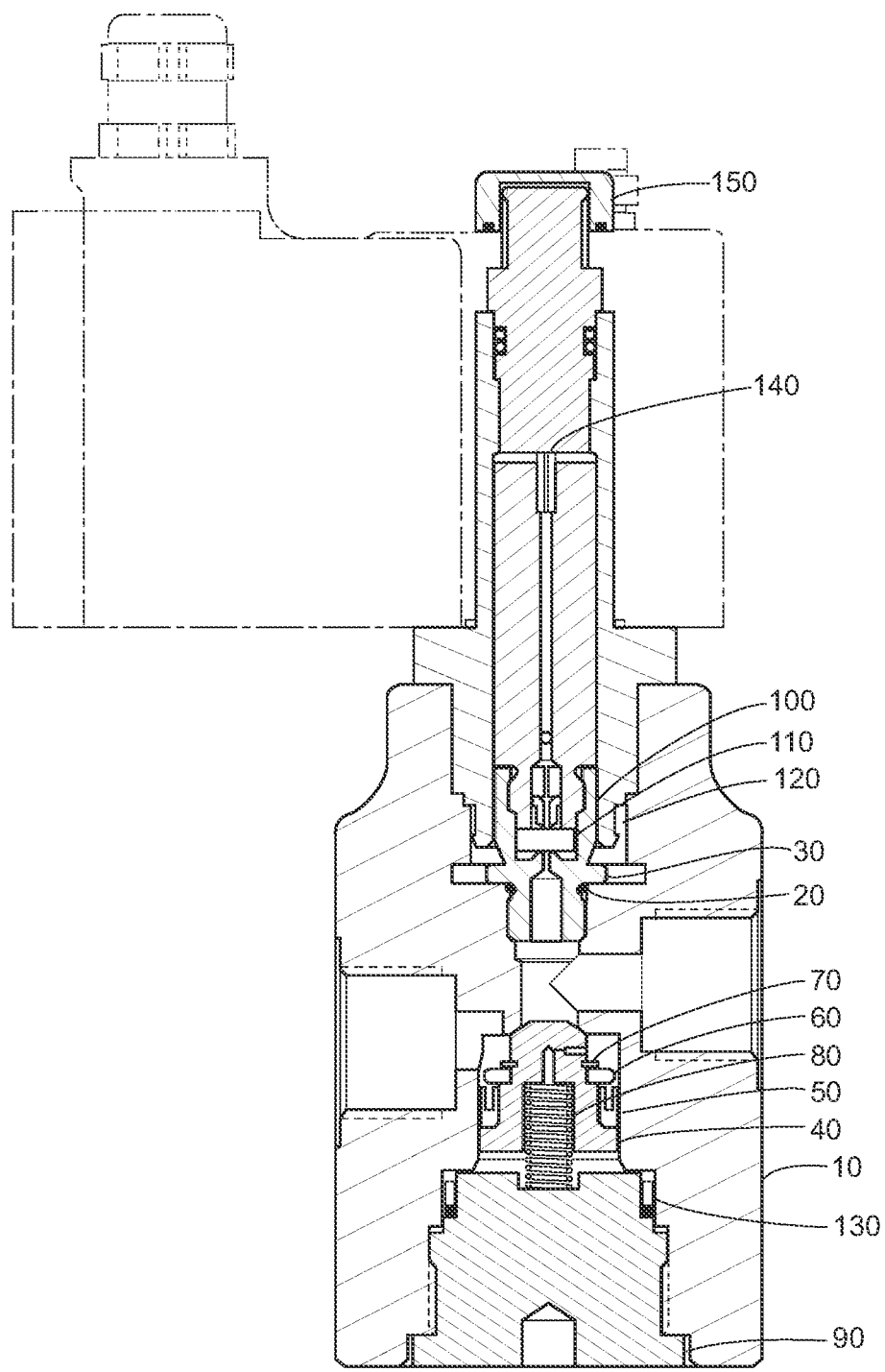
FIG. 6 shows a prior art arrangement requiring the main valve and the pilot valve being disposed on opposite sides of the valve body and having extra pressure boundary requirements.

In operation, when the solenoid is actuated, the pilot cavity pressure will decrease, because the pressure is being vented to the outlet 16 via the passages shown in FIGS. 2, 3 and 4. The pressure then can be rebuilt through inlet bleed hole located in the piston of the main valve, which will cause the pilot cavity pressure to decrease. Once the pilot cavity pressure drops, a pressure imbalance between the pilot cavity pressure and inlet pressure at 14 which will cause the piston main valve to lift and allow flow from the inlet to the outlet.

When assembled as taught herein, the disclosed device may realize on or more functional advantages. The resulting assembly may utilize a standard ASCO coil by designing the pilot stroke as small as possible, thus keeping the overall size of the resulting valve assembly very compact. This may be an advantage relative to other designs that have separated the pilot valve from the main valve by moving the pilot to an opposite side of the valve body rather than having both valves placed into bores oriented on the same side of the valve body. Thus, the disclosed device experiences fewer pressure boundaries relative to prior art devices, which require an extra pressure boundary component thus adding to the size of the valve and adding to the potential for external leakage.

Another possible advantage may be realized in some embodiments by using a plastic sold under the trade name VESPEL SCP 5000 as the piston for the main valve, which offers functional advantages ins systems rated for 14,500 psig with a main flow orifice of about 0.315 inches.

Another possible advantage may be realized by combining a washer into the retaining component to reduce components and make for a more compact design.

Another possible advantage may be realized by having the piston of the main valve and the pilot inline or coaxial with one another but separated and installed from the same side of the valve body. We have realized that the longer stroke is required by the main valve to achieve the proper flow through the main orifice. On the other hand, when using the disclosed arrangement, the proper flow to dump pressure form the pilot cavity may be achieved with a much smaller stroke while still activated the piston of the main valve.

Other functional advantages may be realized when the main and pilot valves are separate. By choosing a solenoid with a coil that creates higher pull forces with a shorter stroke, and by separating the main piston and the pilot valve, the coil only needs to stroke the distance for the pilot valve, rather than having to stroke a combined stroke for both of the main valve and the pilot valve.

Another advantage may be realized by installing the main and pilot valves form the same side. By having the main valve and the pilot valve installed on the same side, the design requires less pressure boundary parts, and the completed valve may be more compact, with fewer parts to assemble and torque, and with fewer possible external leakage locations. Such a resulting valve also may be repaired in the field faster with potentially fewer tools, and can be more easily rebuilt in the field while keeping the valve installed in the process.

The shape and size of the disclosed sleeve effectively retains the high vertical forces from the tube and the pilot seat into the bonnet. In some applications, the sleeve may perform a dual purpose of a magnetic flux circuit and also the retention function of holding the valve together.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A pilot actuated valve assembly, comprising:
    a valve body having an inlet at inlet pressure, an outlet at outlet pressure, a main orifice having a main valve seat, a main valve bore, a pilot seat bore in the valve body and disposed adjacent the main valve bore, and defining a flow passage extending between the inlet and the outlet;
    a main valve disposed in the valve body and including a main valve piston, the main valve shiftable between a closed position where the main valve is seated against the main valve seat and an open position where the main valve is spaced away from the main valve seat;
    a pilot valve including a pilot seat, the pilot seat disposed in the pilot seat bore of the valve body, and a pilot cavity formed between a lower portion of the pilot seat and an upper portion of the main valve piston, the pilot cavity having a pilot cavity pressure;
    a tube having an inner bore and positioned over the pilot valve seat;
    a sleeve mounted to the valve body and including a sleeve bore sized to receive a portion of the tube, the sleeve positioned to retain the pilot seat within the pilot seat bore and to retain a lower portion of the tube adjacent the pilot seat;
    a valve bonnet mounted over the sleeve and securing the sleeve within the valve body;
    the pilot valve disposed within the tube, the pilot valve shiftable between a closed position where the pilot valve is seated against the pilot seat and an open position where the pilot valve is spaced away from the pilot seat;
    a solenoid actuator operatively coupled to a shaft and arranged to shift the pilot valve piston between the closed position and the open position;
    a first passage extending through the main valve between the inlet and the pilot cavity, and a second passage extending between the pilot cavity and the outlet, the second passage closed when the pilot valve is closed and open when the pilot valve is open to vent the pilot cavity pressure to the outlet; and
    wherein the main valve shifts between the closed and open positions in response to shifting of the pilot valve between the closed and open positions.

2. The assembly of claim 1, wherein the main valve piston is slidably disposed within the main valve bore;
    the pilot valve includes a shaft and a piston, the pilot valve piston slidably disposed within the tube and shiftable between a closed position where the pilot valve piston is seated against the pilot seat and an open position where the pilot valve piston is spaced away from the pilot seat; and
    wherein an upper portion of the main body includes a recess, and wherein a lower portion of the sleeve is disposed in the recess.

3. The assembly of claim 1, wherein the pilot valve and the main valve are coaxial.

4. The assembly of claim 3, wherein the solenoid actuator is coaxial with both the pilot valve and the main valve.

5. The assembly of claim 1, wherein the main valve bore has a diameter smaller than a diameter of the pilot seat bore, and wherein the main valve bore and the pilot seat bore are coaxial and formed from a same side of the valve body.

6. The assembly of claim 2, wherein a portion of the pilot cavity is disposed between the main piston and the pilot seat.

7. The assembly of claim 6, wherein the pilot cavity extends to both sides of the pilot valve such that the pilot valve is balanced.

8. A pilot actuated valve assembly, comprising:
    a valve body having an inlet at inlet pressure, an outlet at outlet pressure, a main orifice having a main valve seat, a main valve bore, a pilot seat bore formed in the valve body and overlying the main valve bore, the valve body defining a flow passage extending between the inlet and the outlet;
    a main valve disposed in the valve body and shiftable between a closed position where the main valve is seated against the main valve seat and an open position where the main valve is spaced away from the main valve seat;
    a pilot valve including a pilot seat, the pilot seat disposed in the pilot seat bore of the valve body, and a pilot cavity at a pilot cavity pressure;
    a tube having an inner bore and positioned over the pilot valve seat;
    a sleeve mounted to the valve body and including a sleeve bore sized to receive a portion of the tube, the sleeve positioned to retain the pilot seat within the pilot seat bore and to retain a lower portion of the tube adjacent the pilot seat;
    a valve bonnet mounted over the sleeve and securing the sleeve within the valve body;
    the pilot valve disposed within the tube, the pilot valve shiftable between a closed position where the pilot valve is seated against the pilot seat and an open position where the pilot valve is spaced away from the pilot seat;

a solenoid actuator operatively coupled to the shaft and arranged to shift the pilot valve piston between the closed position and the open position;

a first passage extending through a bleed port in the main valve to the pilot cavity, and a second passage extending between the pilot cavity and the outlet, the second passage closed when the pilot valve is closed and open when the pilot valve is open to vent the pilot cavity pressure to the outlet;

thereby allowing the main valve to shift between the closed and open positions due to a pressure imbalance caused by shifting of the pilot valve between the closed and open positions due to a decrease in pressure in the pilot cavity; and wherein an upper portion of the main body includes a recess, a lower portion of the sleeve is disposed in the recess, and wherein the sleeve is retained in the recess by the valve bonnet threadedly attached to the valve body, a portion of the valve bonnet overlying and engaging a portion of the sleeve.

* * * * *

UNITED STATES PATENT AND TRADEMARK OFFICE
CERTIFICATE OF CORRECTION

PATENT NO. : 11,662,039 B2
APPLICATION NO. : 17/529250
DATED : May 30, 2023
INVENTOR(S) : Jacob T. R. Renollett et al.

It is certified that error appears in the above-identified patent and that said Letters Patent is hereby corrected as shown below:

In the Specification

At Column 1, Line 16, "fuel" should be -- of fuel --.

At Column 1, Line 45, "tube is" should be -- tube --.

At Column 2, Line 30, "closed" should be -- closes --.

At Column 2, Line 30, "open" should be -- opens --.

At Column 3, Line 40, "extends" should be -- that extends --.

At Column 4, Line 2, "12. the" should be -- 12. The --.

At Column 4, Line 2, "assembly 34 having" should be -- assembly 34 has --.

At Column 4, Line 3, "36 is disposed" should be -- 36 disposed --.

At Column 4, Line 45, "on or more" should be -- one or more --.

At Column 4, Line 61, "ins" should be -- in --.

At Column 5, Line 6, "form" should be -- from --.

At Column 5, Line 16, "form" should be -- from --.

Signed and Sealed this
Tenth Day of December, 2024

Katherine Kelly Vidal
*Director of the United States Patent and Trademark Office*